S. H. HALE.
GAS MIXER AND BURNER.
APPLICATION FILED JUNE 19, 1915.
1,215,653.
Patented Feb. 13, 1917.
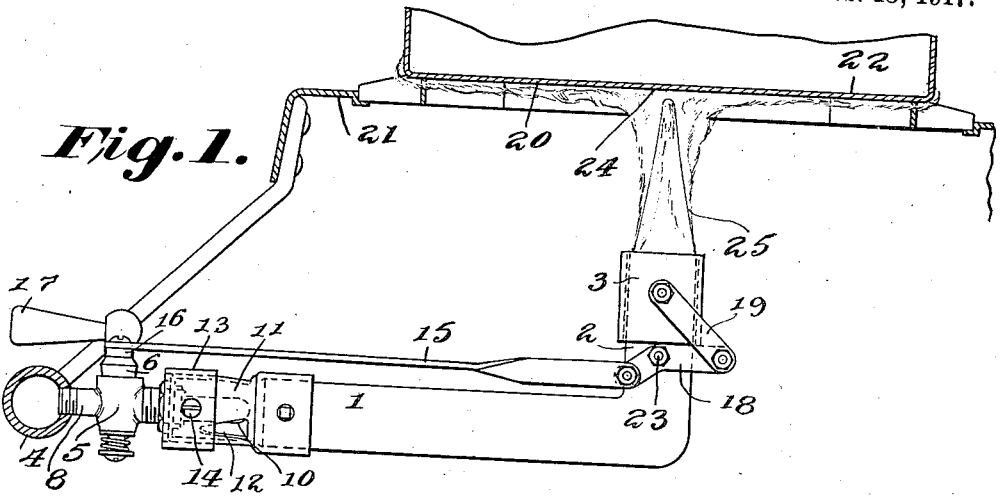
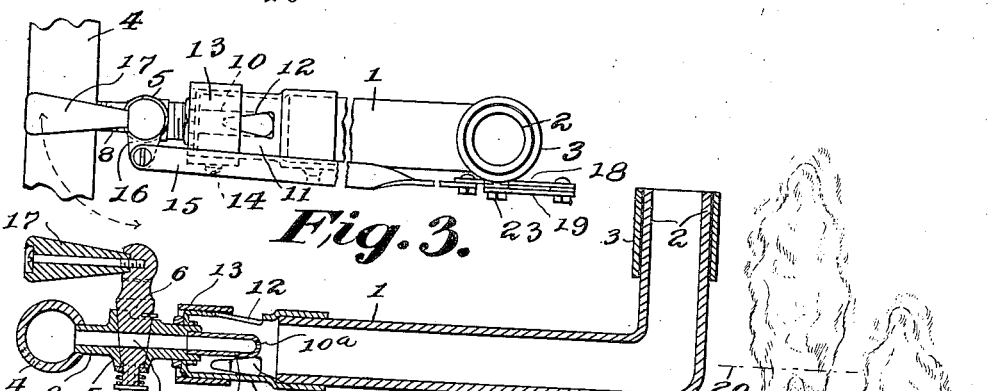
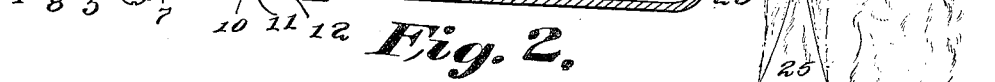
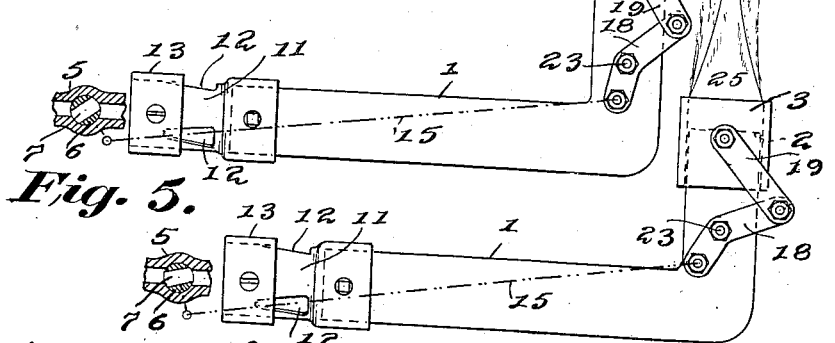
Witnesses
Y. H. Lybrand
George E. Eelin
Stephen H. Hale, Inventor
By H. H. Bliss, Attorney

UNITED STATES PATENT OFFICE.

STEPHEN H. HALE, OF KANSAS CITY, MISSOURI.

GAS MIXER AND BURNER.

1,215,653.  Specification of Letters Patent.  Patented Feb. 13, 1917.

Application filed June 19, 1915. Serial No. 35,111.

*To all whom it may concern:*

Be it known that I, STEPHEN H. HALE, a citizen of the United States, residing at Kansas City, in the county of Jackson and State of Missouri, have invented certain new and useful Improvements in Gas Mixers and Burners, of which the following is a specification, reference being had therein to the accompanying drawing.

This invention relates to improvements in gas burners and pertains to the apparatus for mixing the gas and the air, the means for supplying the gas and air to the mixer and the means for controlling the parts which constitute the burner.

Figure 1 is a view showing a part of a gas stove in section together with a burner, mixer and gas supply mechanism embodying my improvements.

Fig. 2 is a vertical section of the burner, mixer and gas supply devices.

Fig. 3 is a top plan view of the devices in Fig. 2, parts being broken away.

Figs. 4 and 5 are views partly diagrammatic and partly in side elevation showing the burner devices in different positions.

1 indicates a mixing chamber which communicates with a burner 2, 3, the part 3 being movable relatively to the part 2, so that the burner as an entirety is extensible. 4 is a manifold or gas supply pipe. 5 is a valve socket in which is fitted a valve plug 6 with a passage 7. The valve socket has a nipple 8 connected to the manifold. On the opposite side it has a nipple to which is fitted an injector pipe 10, with an escape orifice 10ª adjacent the mixing chamber 1. 11 is a tube surrounding the pipe or nozzle 10, having its outer end connected to the valve nipple, and its inner end connected to the mixing chamber 1. 12, 12 are air orifices in the tube 11 radially opposite the inner end of the pipe 10. 13 is an adjustable cover or shutter fitted to the tube 11 and adapted to be moved longitudinally of the air orifices 12 so as to close or open them under adjustment.

The part 3 of the burner is connected to the gas valve 6 by means of a train of devices comprising a link 15, a crank arm 16 connected to the gas valve, bell lever 18 and a link 19, the lever 18 being pivoted at 23 to the stationary part of the burner, and the link 19 being pivoted to the lever 18 and to the movable element 3 of the burner. The gas valve 6 has a handle 17 by which it can be turned for opening and closing.

In Fig. 1 the parts for delivering, controlling and mixing the gas and air are shown in connection with part of a heater or stove, the latter being indicated by 21. 22 indicates part of a vessel supported on the stove having its bottom surface situated at the line 20.

A gas flame, as is well known, comprises two elements or sub-flames which are approximately conical in shape, one being termed the inner cone and the other the outer cone. The place where the most heat is available is at a plane transverse to the longitudinal lines of the flame and a short distance above the top of the inner cone. Whether the flame be long or short it still remains true that the plane of greatest heat is just above this inner cone. If the base of this cone remains fixed and the flame itself is elongated upward the heat zone is displaced upwardly; and, vice versa, if less gas is supplied and the flame is shortened the inner cone is also shortened and the heat zone is lowered.

It is desirable to maintain this zone fixed in relation to the object which is to be heated whether a large flame with a corresponding consumption of gas is produced or a smaller.

In another application (Serial No. 19,306, filed April 5, 1915) I have shown how this can be accomplished by providing a system of air supply and a system of gas supply so related to each other that the rates of flow of the two gases will be properly relatively modified for different flames.

In the present case I attain the end above referred to (namely, maintaining the plane of greatest heat in a fixed position) by providing for shifting the flame bodily from one position to another corresponding to the rate of gas flow, irrespective of whether the means for admitting air are varied or not, though preferring, under most circumstance, to have the area of air entrance constant. That is to say, I herein provide for maintaining the plane of greatest heat application in a fixed position when the gas supply devices and the burner are so constructed and related that the lengths of the flame cones vary with the gas flow. In the construction shown in the drawings the air inlets, although of such nature that the area of the air passage or passages can be regulated to meet differing conditions, the regulating devices can be fixed in position after adjustment. With such fixed air inlets the cones of the flame will normally decrease in size as the rate of gas flow is lowered. When the gas is entering at its highest rate the flame produced is conventionally indicated in Fig. 1, the flame there shown being the largest flame possible with a gas of given constitution and of given pressure. Ordinarily, with such a flame, when the gas supply is reduced, as before remarked, the lengths of the inner cone and outer cone are also reduced. And if the article (such as that at 22) to be heated is fixed in position, the plane (of the line 20) of highest heat drops to a distance below it and the heat generated at this plane in its new position is not economically applied.

Thus, if the gas valve be partly closed, as shown in Fig. 4 (where, for one example, it will supply three-fourths of the fullest possible volume of gas), the movable element 3 of the burner will be moved upward and with it the base of the flame. And although the inner cone 25 is shorter than it is in the full flame, as in Fig. 1, the horizontal heat plane of the line 20 remains fixed in the position shown in Fig. 1. Then, if the gas valve be still further closed, as shown in Fig. 5 the adjustable element 3 of the burner will be moved still farther upward, carrying with it the base of the flame. The flame cones are still further shortened, but the plane of heat application still remains fixed as in Fig. 1.

The controlling device 13 for the air can be used to close more or less of the air orifices 12 according to the demand for air, which varies with the constitution of the gas and with its pressure.

What I claim is:

1. The combination of a burner adapted to form a flame with a predetermined transverse plane of greatest heat application and to vary the position of the base part of said flame, a mixer communicating with the said burner, air supply devices communicating with the mixer, a gas supply for the mixer, means for regulating the gas supply, and means connecting the gas regulating means with the burner and adapted to shift the base part of the flame relatively to the said heat plane in correspondence with the variations in the gas supply.

2. The combination of a gas burner adapted to form a flame with an inner carbon-monoxid-forming cone having its apex situated approximately in a predetermined transverse plane, means for supplying gas to the burner, means for supplying air thereto, means for regulating the supply of gas, and means connecting the gas regulating means to the burner and adapted to shift the base of the said cone from one position to another in correspondence with the variations in the gas supply.

3. The combination of a two-part gas burner adapted to form a flame with an inner carbon-monoxid-forming cone having its apex situated approximately in a predetermined transverse plane, and one of the parts of said burner being adjustable relatively to the other to vary the base part of said cone, means for supplying gas to the burner, means for supplying air thereto, means for regulating the supply of gas and means connecting the gas regulating means to the movable part of said burner for shifting it in correspondence with variations in the gas supply.

In testimony whereof, I affix my signature, in presence of two witnesses.

STEPHEN H. HALE.

Witnesses:
GEORGE E. EDELIN,
MINA ROBERTSON.